(12) United States Patent
Gu et al.

(10) Patent No.: US 11,637,695 B2
(45) Date of Patent: Apr. 25, 2023

(54) IOT DEVICES, BLOCK CHAIN PLATFORMS AND IOT SYSTEMS FOR RECORDING TRANSPORTATION DATA OF OBJECTS AND METHODS OF USING THE SAME

(71) Applicant: VeChain Global Technology SARL, Luxembourg (LU)

(72) Inventors: Jianliang Gu, Shanghai (CN); Ziheng Zhou, Shanghai (CN); Yang Lu, Shanghai (CN)

(73) Assignee: VeChain Global Technology SARL, Luxembourg (LU)

( * ) Notice: Subject to any disclaimer, the term of this patent is extended or adjusted under 35 U.S.C. 154(b) by 0 days.

(21) Appl. No.: 17/305,494

(22) Filed: Jul. 8, 2021

(65) Prior Publication Data
US 2021/0336775 A1    Oct. 28, 2021

Related U.S. Application Data

(63) Continuation of application No. 16/235,589, filed on Dec. 28, 2018, now Pat. No. 11,088,830.

(30) Foreign Application Priority Data

Dec. 29, 2017    (CN) .......................... 201711483635.1

(51) Int. Cl.
| | |
|---|---|
| *H04L 9/08* | (2006.01) |
| *H04L 9/32* | (2006.01) |
| *H04L 9/00* | (2022.01) |
| *G06F 21/60* | (2013.01) |
| *G06Q 10/08* | (2012.01) |
| *G06F 21/64* | (2013.01) |

(Continued)

(52) U.S. Cl.
CPC .......... *H04L 9/0825* (2013.01); *G06F 21/602* (2013.01); *G06F 21/606* (2013.01);
(Continued)

(58) Field of Classification Search
CPC ..... H04L 9/0825; H04L 9/006; H04L 9/0643; H04L 9/3239; H04L 9/3247; H04L 67/12;
(Continued)

(56) References Cited

U.S. PATENT DOCUMENTS

2009/0222517 A1* 9/2009 Kalofonos ............ H04L 67/104
709/204
2017/0345019 A1    11/2017 Radocchia et al.
(Continued)

FOREIGN PATENT DOCUMENTS

| | | |
|---|---|---|
| CN | 102227108 B | 4/2014 |
| CN | 107426250 A | 12/2017 |

(Continued)

*Primary Examiner* — Michael S McNally
(74) *Attorney, Agent, or Firm* — Downs Rachlin Martin PLLC (57) ABSTRACT

The present disclosure includes IoT devices, block chain platforms, and IoT systems for recording transportation data of an object and methods of using the same. In some examples, IoT devices are one time programmed with a private key in a manufacturing process of the IoT device. In some examples, IoT devices may include at least one sensor configured to detect external environment data of an object during transportation of the object; and a processor configured to receive the data from the sensor and generate a data packet based on the data using a private key, the data packet including a unique identification number of the IoT device, the data and a signature generated according to the unique identification number and the data.

21 Claims, 5 Drawing Sheets

(51) Int. Cl.
*H04W 4/80* (2018.01)
*H04L 9/06* (2006.01)
*H04L 67/12* (2022.01)
*G06Q 10/0832* (2023.01)

(52) U.S. Cl.
CPC ............ *G06F 21/64* (2013.01); *G06Q 10/08* (2013.01); *G06Q 10/0832* (2013.01); *H04L 9/006* (2013.01); *H04L 9/0643* (2013.01); *H04L 9/3239* (2013.01); *H04L 9/3247* (2013.01); *H04L 67/12* (2013.01); *H04W 4/80* (2018.02); *G06F 2221/2107* (2013.01); *H04L 9/50* (2022.05); *H04L 2209/805* (2013.01)

(58) Field of Classification Search
CPC ............ H04L 2209/805; G06F 21/602; G06F 21/606; G06F 21/64; G06F 2221/2107; H04W 54/80; G06Q 10/08; G06Q 10/0832

USPC .......................................................... 713/171

See application file for complete search history.

(56) References Cited

U.S. PATENT DOCUMENTS

| | | | |
|---|---|---|---|
| 2017/0346833 A1* | 11/2017 | Zhang | G06F 16/951 |
| 2017/0374042 A1* | 12/2017 | James | H04L 63/0442 |
| 2018/0183587 A1* | 6/2018 | Won | H04W 4/70 |
| 2019/0068592 A1* | 2/2019 | Mattela | H04L 63/0876 |

FOREIGN PATENT DOCUMENTS

| | | |
|---|---|---|
| CN | 107438002 A | 12/2017 |
| WO | 2017007725 A1 | 1/2017 |
| WO | 2017207316 A1 | 12/2017 |

\* cited by examiner

IOT DEVICES, BLOCK CHAIN PLATFORMS AND IOT SYSTEMS FOR RECORDING TRANSPORTATION DATA OF OBJECTS AND METHODS OF USING THE SAME

RELATED APPLICATION DATA

This application is a continuation of U.S. patent application Ser. No. 16/235,589, filed on Dec. 28, 2018, and titled "IoT Devices, Block Chain Platforms and IoT Systems for Recording Transportation Data of Objects and Methods of Using the Same," which claims the benefit of priority of Chinese Patent Application No. 201711483635.1, filed on Dec. 29, 2017, and titled "Methods, Medium, IoT Device, Block Chain Platform and IoT System for Recording Transportation Data of Object," each of which is incorporated by reference herein in its entirety.

FIELD OF THE INVENTION

The present disclosure generally relates to the field of Internet of Things (IoT), and particularly to IoT devices, block chain platforms and IoT systems for recording transportation data of an object and methods of using the same.

BACKGROUND

Currently, with the improved requirements to various kinds of cargoes and the development of logistics transportation networks, refrigerated transportation has become a popular manner of transportation, especially for some cargoes that were not capable or not easily transported long distances. For example, some fresh foods such as vegetables, fruits and meat and some processed foods such as flash-frozen foods and milk products can be delivered thousands of miles from their places of production to local supermarkets or customer's homes through refrigerated transportation. Furthermore, some medicines and medical equipment that should be kept at low temperature may also need to be transferred from one place to another by refrigerated transportation. Refrigerated transportation may be through highways, waterways, railways and airways, or may be a composite of multiple different transportation channels. During the entire transportation process, including all of loading and unloading, transferring transportation type or changing packaging facility, the object to be transported should be kept at a certain temperature.

In current refrigerated transportation, temperature detection devices are used to detect and record temperatures of respective locations, such as the warehouse at the place of production, the transportation device (such as a refrigerator car) and the destination (such as a supermarket or distribution site).

SUMMARY OF THE DISCLOSURE

Existing temperature detection devices use a common temperature sensor without identification, such that the resulting final temperature data may have been tampered with. For example, in many refrigerator cars, the temperature detection device is fixed in the compartment and is powered by the vehicle itself. During a long transportation, it is possible for the driver to turn off the power supply to the refrigerator compartment for power saving but keep the reading of the temperature detection device constant. Thus, when the cargo arrives at the destination, a series of constant temperature values that meet the requirements are obtained from the temperature detection device, but in fact, the cargo did not always stay at that temperature value during the transportation.

Furthermore, in the current temperature detecting and recording process, it is usually only possible to detect the environment temperature at a specific point in each location (such as the warehouse, the transportation facility and the destination) such that the measured temperature is not reflective of the temperature of the cargo itself, which may be at a distance from the specific measurement point.

Further, with current refrigerated transportation, the temperature data is read out from the temperature detection device upon reaching the destination and transmitted to a central database, and thus the data in such a database is easily tampered with and deleted, resulting in unreliable data.

In addition to refrigerated transportation, for the transportation of some other special cargoes, such as fragile items, various data during the transportation of the cargoes should be continuously recorded to ensure that the transportation conditions always meet requirements.

In view of at least one of the above problems, the present disclosure proposes a method and an IoT device for recording transportation data of an object and an IoT system including such an IoT device.

According to a first aspect of the present disclosure, an IoT device for recording transportation data of an object is provided. The IoT device has been one time programmed with a private key in a manufacturing process of the IoT device. The IoT device includes: at least one sensor configured to detect external environment data of the object during transportation of the object; and a processor configured to receive the data from the sensor and generate a data packet based on the data using the private key, the data packet including a unique identification number of the IoT device, the data and a signature generated based on the unique identification number and the data.

According to a second aspect of the present disclosure, a method for recording transportation data of an object is provided. The method includes receiving external environment data of the object detected during transportation of the object from at least one sensor of an IoT device, the IoT device having been one time programmed with a private key in a manufacturing process of the IoT device; and generating a data packet based on the data using the private key, the data packet including a unique identification number of the IoT device, the data and a signature generated based on the unique identification number and the data.

According to a third aspect of the present disclosure, a nonvolatile computer readable medium for recording transportation data of an object is provided. The nonvolatile computer readable medium includes computer program codes for receiving external environment data of the object detected during transportation of the object from at least one sensor of an IoT device, the IoT device having been one time programmed with a private key in a manufacturing process of the IoT device; and computer program codes for generating a data packet based on the data using the private key, the data packet including a unique identification number of the IoT device, the data and a signature generated based on the unique identification number and the data.

According to a fourth aspect of the present disclosure, a block chain platform for recording transportation data of an object is provided. The block chain platform includes an underlying block chain; and an application server or a smart contract entity configured to receive a data packet from an IoT device, authenticate the data packet based on a public key of the IoT device and store the data of the data packet to the underlying block chain upon a successful authentication.

According to a fifth aspect of the present disclosure, a method for recording transportation data of an object is provided. The method includes receiving a data packet from an IoT device; authenticating the data packet based on a public key of the IoT device; and storing the data of the data packet to the underlying block chain upon a successful authentication.

According to a sixth aspect of the present disclosure, a nonvolatile computer readable medium for recording transportation data of an object is provided. The nonvolatile computer readable medium includes computer program codes for receiving a data packet from an IoT device; computer program codes for authenticating the data packet based on a public key of the IoT device; and computer program codes for storing the data of the data packet to the underlying block chain upon a successful authentication.

Compared with conventional IoT devices and systems for recording transportation data of an object, the solution of the present disclosure may ensure accurate detecting and recording of the transportation data of the object and may prevent the data from being tampered with.

BRIEF DESCRIPTION OF THE DRAWINGS

The present disclosure will be understood better and other objectives, details, features and advantages of the present disclosure will become more evident from the description of specific embodiments of the disclosure given in conjunction with the following figures, wherein.

DETAILED DESCRIPTION

Embodiments of the present disclosure will now be described in more detail in conjunction with accompanying figures. Although embodiments of the present disclosure are shown in the accompanying figures, it should be understood that the present disclosure can be embodied in various ways but not be limited to the embodiments depicted herein. Instead, the embodiments are provided herein to make the disclosure more thorough and complete and convey the scope of the present disclosure to those skilled in the art.

Figure 1:
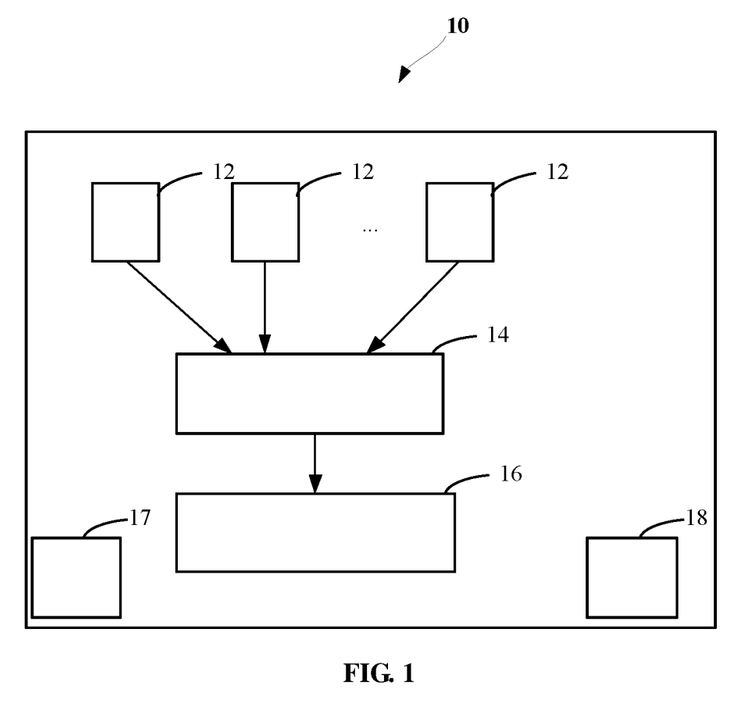
FIG. 1 illustrates a structure block diagram of the IoT device for recording transportation data of an object according to the present disclosure.

FIG. 1 illustrates a functional block diagram of an IoT device 10 for recording transportation data of an object according to the present disclosure. As shown in FIG. 1, the IoT device 10 includes at least one sensor 12 and a processor 14. The sensor 12 is configured to detect the external environment data of the object during transportation of the object.

The sensor 12 may be any one, or combination of several of, an environmental sensor, a motion sensor, a gas sensor and a location sensor, as described below.

In one implementation, the sensor 12 may be an environmental sensor such as a temperature sensor, a humidity sensor or an air pressure sensor. For example, in the refrigerated transportation as described in the background, when transporting fresh foods such as vegetables, fruits or meat and milk products, the temperature and humidity during transportation is significantly important for maintaining the quality of the cargo. Therefore, sensor 12 may include a temperature sensor and/or a humidity sensor to monitor the temperature and/or humidity of the cargo during the transportation. As another example, some cargo should be transported under a certain air pressure such as a low air pressure or a high air pressure, in which case sensor 12 may include an air pressure sensor to monitor the air pressure during transportation of the cargo.

In another implementation, the sensor 12 may be a motion sensor (or an inertial sensor) such as a gyroscope, an acceleration sensor or a compass sensor. For example, for some fragile items, the acceleration or shock during the transportation should be monitored, in which case sensor 12 may include an acceleration sensor.

In yet another implementation, the gas sensor includes sensors for detecting various gases such as carbon monoxide (CO), carbon dioxide (CO2), formaldehyde like gases, which may be gas sensors utilizing various principles. For example, to transport some cargo sensitive to certain gas, sensor 12 may include a gas sensor for monitoring the concentration of such gas.

Furthermore, the sensor 12 may also be a location sensor such as Global Positioning System (GPS) sensor for detecting the location and trajectory of cargo during transportation.

Figure 2:
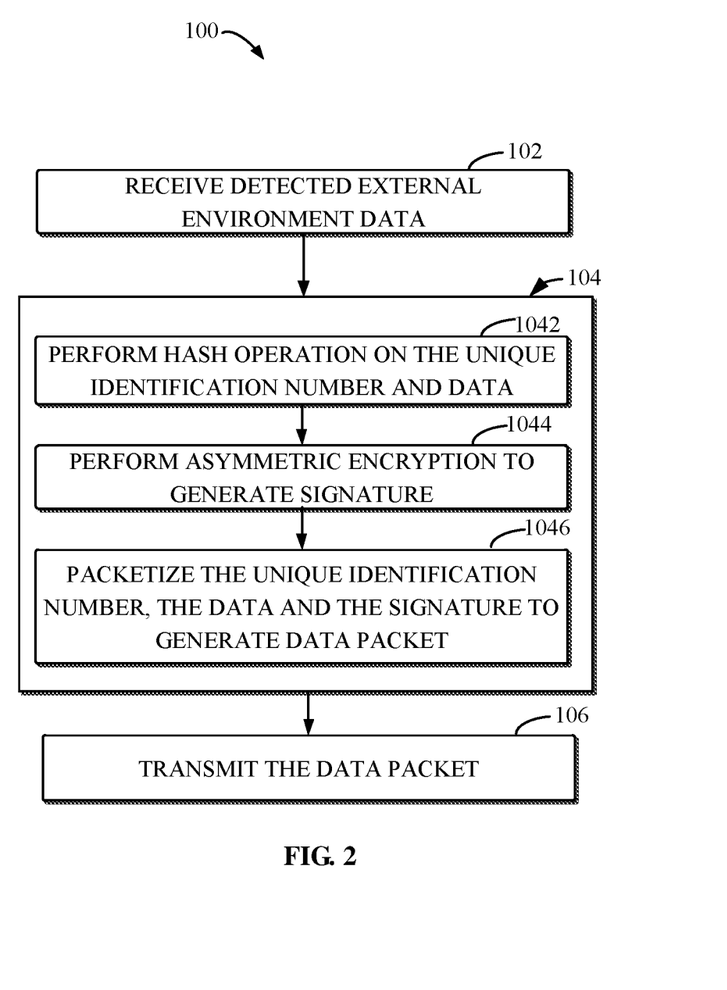
FIG. 2 illustrates a flow chart of a method for recording transportation data of an object according to the present disclosure.

FIG. 2 illustrates a flow chart of a method 100 for recording transportation data of an object according to the present disclosure. The method may be implemented by the processor 14 shown in FIG. 1, for example. The method 100 is described hereinafter in connection with FIG. 1 and FIG. 2.

The processor 14 may be configured to receive the detected external environment data from the sensor 12 (step 102). Unlike conventional IoT devices, the IoT device 10 according to the present disclosure has a unique identification number and is associated with a pair of public key and private key specific to the IoT device 10. Furthermore, the processor 14 is configured to process the data received from the sensor 12 with the private key of the pair of public key and private key to generate a data packet (step 104). The private key may be one time programmed (OTP) to the IoT device 10 within, for example, a memory 17 of the IoT device 10 as shown in FIG. 1, during the production of the IoT device 10. Here, OTP means programming data on a non-volatile memory where the setting of each bit is locked by a fuse or antifuse. The memory on which the OTP may be performed is one type of read-only memory (ROM) and data may be burned on such a memory only once. Therefore, the data on such a memory is permanent and cannot be changed. By one time programming the private key into the IoT device 10 during the manufacturing process of the IoT device 10, the private key of the IoT device 10 cannot be changed during the entire lifecycle of the IoT device 10 and thus the safety of the private key, and therefore the data obtained by the sensor 12, may be ensured. In one example, the data packet includes at least the unique identification number of the IoT device 10, the data received from the sensor 12 and a signature generated according to the unique identification number and the data.

In one implementation, the processor 14 may use the public key in the pair of public key and private key as the unique identification number of the IoT device 10. By reusing the public key in the pair of public key and private key as the unique identification number of the IoT device 10, the signaling needed for the platform 20 to identify the IoT device 10 is reduced. In this case, by registering the unique identification number of the IoT device 10 to a block chain platform, the block chain platform may obtain both the unique identification number and the public key of the IoT device 10.

In another implementation, the unique identification number of the IoT device 10 is generated by the processor 14 based on the public key of the pair of public key and private key. For example, the processor 14 may perform a cryptographic hash operation on the public key and use the result of the hash operation (the hashed public key) as the unique identification number of the IoT device 10. By separately setting the unique identification number and the public key of the IoT device 10, the public key of the IoT device 10 may be protected and all unique identification numbers of IoT devices provided by a same provider may have a same length if a same hash operation is used. In this case, the IoT device 10 may transmit its public key to the block chain platform by a registration process, and inform the block chain platform of the hash operation that was used, by preconfiguring or signaling separately, for example. Those skilled in the art may understand that the present disclosure is not limited thereto, and the unique identification number of the IoT device 10 may be generated or be assigned in any known or to be developed manners for example, in order for the unique identification number to globally identify the IoT device 10.

In one implementation, the generation of the data packet in step 104 may include the following sub-steps. Firstly, the processor 14 performs a hash operation on the combination of the unique identification number of the IoT device 10 and the data received from the sensor 12 (sub-step 1042). In contrast to only performing the hash operation on the detected data, both the unique identification number and the detected data may be protected by performing the hash operation on both of them. Subsequently, the processor 14 performs an asymmetric encryption on the result of the hash operation to generate the signature with the private key in the pair of public key and private key (sub-step 1044). Herein, the hash operation may be any of the general MD4, MD5, SHA-1, SHA-2, SHA-3 or BLAKE2 algorithms. Further, it should be noted that the hash operation performed by the processor 14 on the unique identification number and the data may be identical to or different from the hash operation described above for generating the unique identification number of the IoT device 10. Finally, the processor 14 packetizes the unique identification number of the IoT device, the data received from the sensor 12 and the generated signature into a data packet (sub-step 1046).

In one example, the content of the data packet generated by the processor 14 may include the unique identification number of the IoT device 10, the data received from the sensor 12 and the signature generated by the processor 14, while the format of the data packet may be fixed or flexible as described in the following.

Furthermore, the processor 14 is further configured to transmit the generated data packet to the block chain platform (such as the block chain platform 20 shown in FIG. 3) for storage (step 106). In this regard, the IoT device 10 may further include a communication module 16 that is configured to receive the data packet from the processor 14 and transmit the data packet to the block chain platform for storage. Prior to the transmission of the data packet, the communication module 16 is further configured to register the unique identification number of the IoT device 10 to the block chain platform.

In some cases, it may be desired to read out all of the data obtained during the transportation of an object collectively at a destination. For this purpose, the IoT device 10 may be equipped with an offline communication function. In these cases, the communication module 16 may include an offline communication interface that may be used to communicate with a scanner in a near distance communication manner to transmit the data packet generated by the processor 14 to the scanner, which in turn forwards the data packet to the block chain platform. Herein, the near distance communication manner may include at least one of Near Field Communication (NFC), Radio Frequency Identification (RFID) or other known or to be developed near distance communication manners in the art such as WiFi, Bluetooth, and ZIGBEE.

In some cases, it may be desired to monitor data generated by sensor(s) 12 during the transportation of the object in real time or substantially real time. For this purpose, the IoT device 10 may be equipped with an online communication function. In these cases, the communication module 16 may include an online communication interface that may be used to connect with a radio access network directly and transmit the data packet generated by the processor 14 to the block chain platform over the radio access network. Herein, the online communication function of the communication module 16 may be implemented by any Radio Access Technology (RAT) known or to be developed in the art.

It may be appreciated by those skilled in the art that whether the communication module 16 is configured to support the online communication or the offline communication or both depends on various factors such as the production cost or the cargo to be monitored.

In addition to the wireless communication function as described above, the communication module 16 of the IoT device 10 may also support a wired communication function. In this case, the communication module 16 may include a wired communication interface such as a USB interface that transmits the data packet generated by the processor 14 to the block chain platform directly or indirectly through a data cable such as a USB cable.

Furthermore, the IoT device 10 may further include a power supply component 18 which is used to power the IoT device 10. The power supply component 18 may be a battery, for example. Different from conventional detection devices powered by an external power source, an internal power supply 18 may further prevent data obtained by the sensor 12 from being tampered with by powering the IoT device 10 with the power supply component contained in itself.

It may be understood that the IoT device 10 according to the present disclosure may further include some other components relevant to or not relevant to the present solution such as a memory, a transceiver, an antenna, etc., which will not be described in detail herein.

Figure 3:
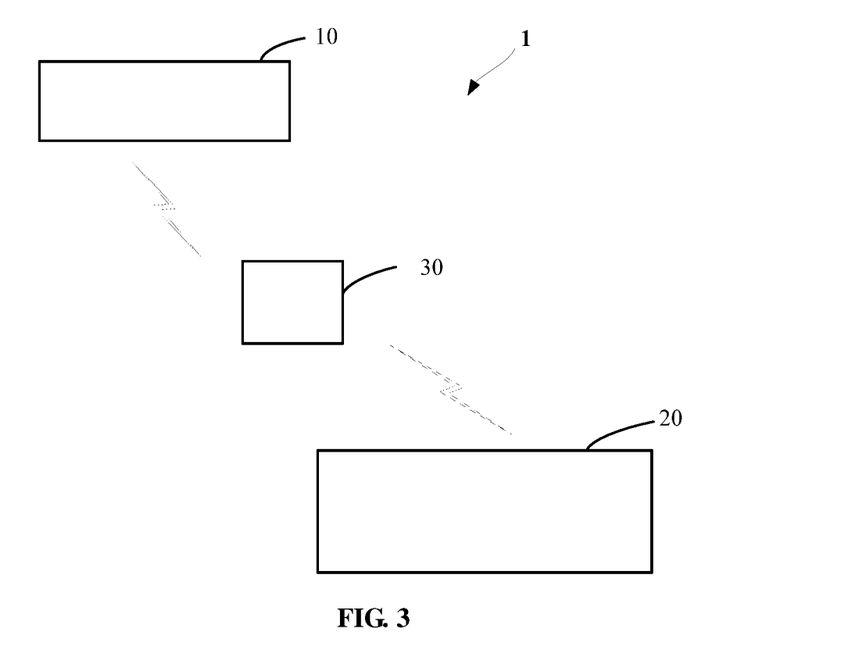
FIG. 3 illustrates a schematic view of an IoT system for recording transportation data of an object according to the present disclosure.

FIG. 3 illustrates an IoT system 1 for recording transportation data of an object according to the present disclosure.

As shown in the FIG. 3, in addition to the IoT device 10 described above in connection with the FIG. 1, the IoT system 1 further includes a block chain platform 20. The block chain platform 20 is configured to receive the data packet generated by the processor 14 from the IoT device 10, authenticate the data packet based on the public key of the IoT device 10 and store the data in the data packet upon a successful authentication.

As described above, the format of the data packet may be fixed or flexible. In one implementation, a fixed format of data packet may be used. The following Table 1 shows an exemplary fixed format of the data packet.

TABLE 1

| Unique Identification Number | Data | Signature |
| --- | --- | --- |

Herein, the field of Unique Identification Number indicates the unique identification number of the IoT device 10, the field of Data indicates the data detected by the sensor 12, and the field of Signature indicates the signature generated by the processor 14 according to the unique identification number of the IoT device 10 and the data detected by the sensor 12. It may be understood by those skilled in the art that the fixed format of the data packet is not limited to the specific sequence or form as shown in Table 1, but may adopt other forms that can be conceived by those skilled in the art.

In case of fixed format of data packet, the fixed format may be preconfigured in the IoT device 10 and the block chain platform 20, respectively. For example, respective lengths and sequence of the fields of Unique Identification Number, Data and Signature may be preconfigured.

Figure 4A:
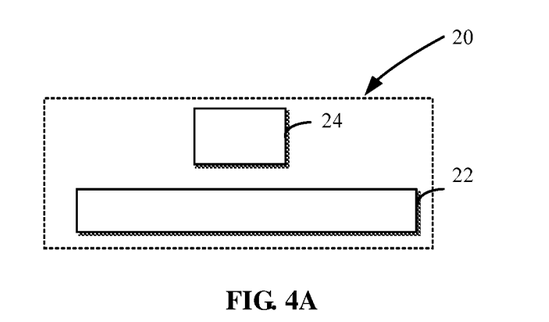
FIG. 4A illustrates a block diagram of a block chain platform according to one embodiment of the present disclosure.

FIG. 4A illustrates a block diagram of the block chain platform 20 according to one embodiment of the present disclosure. As shown in FIG. 4A, the block chain platform 20 includes an underlying block chain 22 and an application server 24 interfaced with the underlying block chain 22, which may be an application server of a provider that provides a service of recording transportation data according to present disclosure.

Figure 4B:
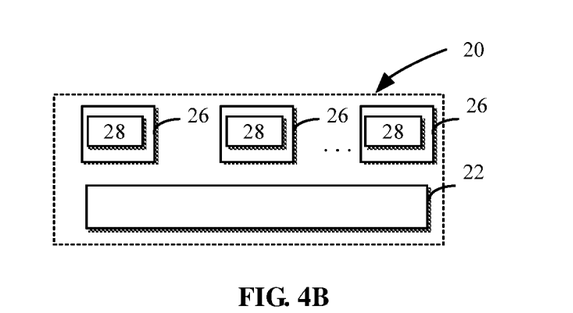
FIG. 4B illustrates a block diagram of a block chain platform according to another embodiment of the present disclosure.

FIG. 4B illustrates a block diagram of the block chain platform 20 according to another embodiment of the present disclosure. As shown in FIG. 4B, the block chain platform 20 includes an underlying block chain 22 that includes a plurality of block chain nodes 26. In this implementation, a smart contract (such as the smart contract 28 shown in FIG. 4B) dedicated to recording the transportation data may be developed and distributed to the block chain platform 20, for example, to a plurality of block chain nodes 26. Here, the block chain nodes 26 may be regarded as the hosts of the smart contract 28, and are also referred to in the present disclosure as the smart contract entity 28. The smart contract 28 may be developed by a developer of the system 1 or other providers and may be regarded as part of the system 1.

Here, the underlying block chain 22 may be any block chain known in the art or to be developed in the future, including public block chain, private block chain or consortium block chain, which will not be described in detail herein.

Figure 5:
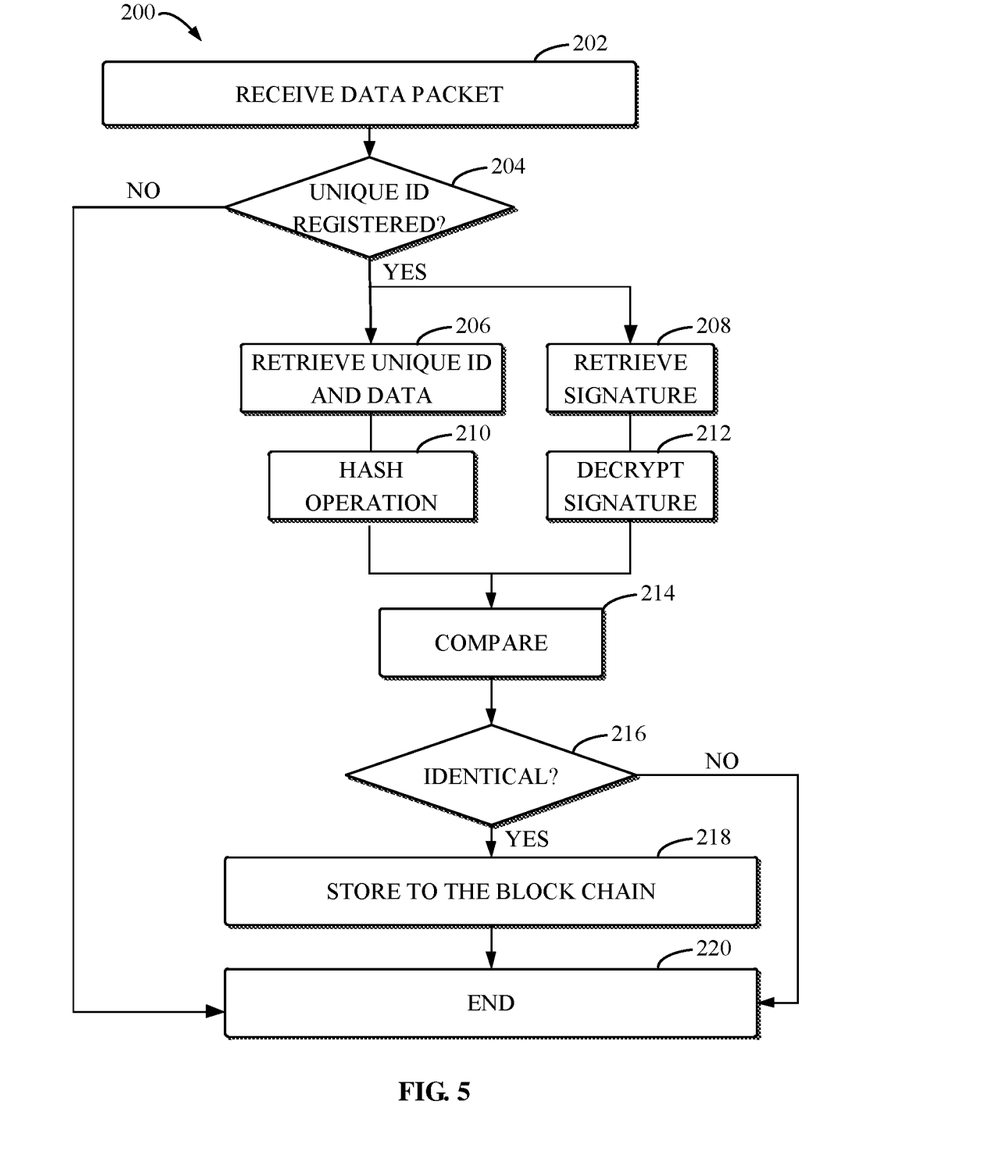
FIG. 5 illustrates a flow chart of a method for recording transportation data of an object according to the present disclosure.

FIG. 5 illustrates a flow chart of a method 200 for recording transportation data of an object according to the present disclosure. The method 200 may be implemented by the block chain platform 20. Hereinafter the method 200 will be described in connection with FIGS. 4A-4B and FIG. 5.

In step 202, the block chain platform 20 receives a data packet from the IoT device 10. It should be appreciated that the data packet includes the unique identification number of the IoT device 10. Then, the block chain platform determines whether the unique identification number has been registered (step 204). If the unique identification number has been registered (YES in step 204), the block chain platform 20 retrieves the combination of the unique identification number of the IoT device 10 and the data detected by the sensor 12 from the data packet (step 206), and retrieves the signature from the data packet (step 208). Then, the block chain platform 20 performs a same hash operation on the combination of the unique identification number and the data as the hash operation performed by the processor 14 to generate the data packet as described above (step 210), and decrypts the signature using the public key of the IoT device 10 (step 212). Subsequently, the block chain platform 20 compares the result of the hash operation obtained in step 210 and the result of the decryption obtained in step 212 (step 214) and determines whether they are the same (step 216). If they are the same (YES in step 216), which indicates a successful authentication of the data packet, the data in the data packet is stored on the block chain platform 20. Due to the anti-tamper characteristic of the block chain itself, the data on the block chain platform 20 may be safely stored.

Depending on the implementation of the block chain platform, respective steps of the method 200 may be implemented by the application server 24 or the smart contract entity 28 or the combination thereof. For example, steps 202 to 216 of the method 200 may be all performed by the application server 24 shown in FIG. 4A or the smart contract entity 28 shown in FIG. 4B, and then at step 218 the data is stored on the underlying block chain 22. Alternatively, the steps 202, 204, 208 and 212 of the method 200 may be performed by the application server 24 and other steps are performed by the smart contract entity 28. In this case, the block chain platform 20 may be implemented as a combination of that in FIG. 4A and that in FIG. 4B.

In examples where the communication module 16 includes an offline communication interface, the IoT system 1 may further include a scanner 30, which may receive the data packet from the IoT device 10 and forward the data packet to the block chain platform 20. Depending on the near distance communication manner supported by the IoT device 10, the scanner 30 should support the same near distance communication manner.

According to the solution of the present disclosure, when the cargo begins to be transported, the IoT device 10 may be powered on and placed together with the cargo (in the package of the cargo, for example). Respective data packets generated by the IoT device 10 during the transportation procedure may be transmitted periodically or aperiodically to the block chain platform 20 at respective locations (such as the warehouse, the transportation facility and the destination) of the whole transportation procedure (in case that the IoT device 10 supports an online communication function), or all the data packets generated during the transportation procedure may be retrieved at once from the IoT device 10 when the cargo reaches the destination and transmitted to the block chain platform 20 (in case that the IoT device 10 supports an offline communication function).

By assigning a unique identification number to the IoT device 10, it may prevent the sensor 12 from being replicated and fake data from being obtained from the replicated sensor.

By one time programming the private key to the IoT device 10 with a programming software, encrypting the data obtained by the sensor 12 with the private key and decrypting the data by the block chain platform 20 with the corresponding public key, the safety of the data transmission may be ensured.

In addition, by uploading the data to the block chain platform and authenticating and storing the data by the block chain platform, the safety of the data storage may be further improved.

In one or more exemplary designs, the functions described by the present disclosure may be implemented in hardware, software, firmware, or any combination thereof. If implemented in software, the functions may be stored on or transmitted over as one or more instructions or code on a computer-readable medium.

The various units of the device described herein may be implemented with discrete hardware components or integrally in a single hardware component such as a processor. For example, the various illustrative logical blocks, modules, and circuits described in connection with the aspects disclosed herein may be implemented within or performed by a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

Those skilled in the art would further appreciate that any of the various illustrative logical blocks, modules, processors, means, circuits, and algorithm steps described in connection with the aspects disclosed herein may be implemented as electronic hardware, computer software, or combinations of both.

Example implementations of the present disclosure may include a method for recording transportation data of an object, the method including receiving external environment data of the object detected during transportation of the object from at least one sensor of an Internet of Things (IoT) device, the IoT device having been one time programmed with a private key in a manufacturing process of the IoT device; and generating a data packet based on the data using the private key, the data packet including a unique identification number of the IoT device, the data and a signature generated based on the unique identification number and the data.

Example implementations of the present disclosure may also include a nonvolatile computer readable medium for recording transportation data of an object, which may include machine-executable instructions for receiving external environment data of the object detected during transportation of the object from at least one sensor of an Internet of Things (IoT) device, the IoT device having been one time programmed with a private key in a manufacturing process of the IoT device; and machine-executable instructions for generating a data packet based on the data using the private key, the data packet including a unique identification number of the IoT device, the data and a signature generated based on the unique identification number and the data.

Example implementations of the present disclosure may also include a method for recording transportation data of an object, the method including receiving a data packet from an IoT device; authenticating the data packet based on a public key of the IoT device; and storing data contained in the data packet to an underlying block chain upon a successful authentication.

Example implementations of the present disclosure may also include a nonvolatile computer readable storage medium for recording transportation data of an object, which may include machine-executable instructions for receiving a data packet from an IoT device; machine-executable instructions for authenticating the data packet based on a public key of the IoT device; and machine-executable instructions for storing data contained in the data packet to an underlying block chain upon a successful authentication.

The previous description is provided to enable any person skilled in the art to make or use the present disclosure. Various modifications to the present disclosure will be readily apparent to those skilled in the art, and the generic principles defined herein may be applied to other aspects without departing from the scope of the disclosure. Thus, the present disclosure is not intended to be limited to the examples and designs shown herein but is to be accorded the widest scope consistent with the principles and novel features disclosed herein.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of recording transportation data of an object with an Internet of Things (IoT) device, the IoT device including at least one sensor configured to detect external environment data of the object during transportation of the object, a processor, a private key, and a unique identification number, the method comprising:
   receiving the data from the sensor;
   performing a hash operation on at least the data;
   using the private key to perform an asymmetric encryption on the result of the hash operation to generate a signature; and packetizing the unique identification number, the data, and the signature into a data packet.

2. The method of claim 1, further comprising:
generating, with the processor, the unique identification number using a public key corresponding to the private key.

3. The method of claim 1, further comprising:
performing a hash operation on a public key corresponding to the private key and using the result of the hash operation as the unique identification number.

4. The method of claim 1, further comprising: using a public key corresponding to the private key as the unique identification number.

5. The method of claim 1, wherein the step of performing a hash operation includes performing a hash operation on a combination of the unique identification number and the data.

6. The method of claim 1, further comprising: registering the unique identification number of the IoT device to a block chain platform.

7. The method of claim 1, further comprising: transmitting the data packet to a block chain platform.

8. The method of claim 1, further comprising transmitting the data packet to a block chain platform for storage with at least one of (1) an online communication interface of the Iot device that is connected with a radio access network directly and configured to transmit the data packet to the block chain platform over the radio access network, (2) an offline communication interface of the IoT device configured to communicate with a scanner in a near distance communication to transmit the data packet to the scanner for forwarding the data packet to the block chain platform; or (3) a wired communication interface of the IoT device for transmitting the data packet directly or indirectly to the block chain platform through a data cable.

9. The method of claim 1, wherein the sensor includes at least one of an environmental sensor, a motion sensor, a gas sensor and a location sensor.

10. The method of claim 1, wherein the IoT device includes a power supply component for powering the IoT device.

11. A method of recording transportation data of an object with a blockchain platform, the blockchain platform including an underlying block chain and at least one processor, the method comprising:
receiving a data packet from an IoT device that includes a unique identification number of the IoT device, sensor data and a signature;
performing a hash operation on at least the data;
decrypting the signature using a public key of the IoT device;
comparing a result of the hash operation and a result of the decrypting; and
storing the sensor data to the underlying block chain if the result of the hash operation and the result of the decrypting are the same.

12. The method of claim 11, wherein the signature was generated based on a combination of the unique identification number and the sensor data and wherein the step of performing a hash operation includes performing a hash operation on the combination of the unique identification number and the data, the hash operation being same as a hash operation performed by a processor of the IoT device on the combination of the unique identification number and the data.

13. The method of claim 11, further comprising receiving the data packet from a scanner communicatively coupled with the IoT device.

14. A method of recording transportation data of a plurality of objects with a plurality of Internet of Things (IoT) devices and at least one scanner, the method comprising:
receiving, at the scanner, from each of the plurality of IoT devices, data packets generated by the IoT devices that include a unique identification number of the IoT device, sensor data recorded by a sensor of the IoT device, and a signature generated by the IoT device based on at least the data; and
transmitting the data packets to a block chain platform for storage.

15. The method of claim 14, wherein the step of receiving includes communicating with each of the IoT devices using a near distance communication protocol.

16. The method of claim 15, wherein the near distance communication protocol is Near Field Communication (NFC), Radio Frequency Identification (RFID), Bluetooth, or ZIGBEE.

17. The method of claim 14, wherein the step of receiving includes communicating with each of the IoT devices via an offline communication interface of the IoT devices.

18. The method of claim 14, wherein the signature is an encrypted version of a result of a hash operation performed on at least the sensor data.

19. The method of claim 14, wherein the signature is an encrypted version of a result of a hash operation performed on a combination of the sensor data and a unique identification number of the IoT device.

20. A method of recording transportation data of an object with a blockchain platform, the blockchain platform including an underlying block chain and at least one processor, the method comprising:
receiving a data packet from a scanner communicatively coupled with an IoT device;
authenticating the data packet based on a public key of the IoT device; and
storing the data of the data packet to the underlying block chain upon a successful authentication.

21. The method of claim 20, wherein the step of authenticating the data packet based on a public key of the IoT device includes:
performing a hash operation on at least the data;
decrypting a signature included in the data packet using a public key of the IoT device; and
comparing a result of the hash operation and a result of the decrypting.

* * * * *